United States Patent [19]

Higurashi et al.

[11] Patent Number: 4,633,332
[45] Date of Patent: Dec. 30, 1986

[54] MULTI-MODE MAGNETIC RECORDING SYSTEM AND MULTI-MODE MAGNETIC RECORDING AND PLAYBACK SYSTEM FOR VTR

[75] Inventors: Seiji Higurashi, Chiba; Atsushi Miyashita, Tokyo; Kaoru Kobayashi, Yokohama, all of Japan

[73] Assignee: Victor Company of Japan, Limited, Kanagawa, Japan

[21] Appl. No.: 567,977

[22] Filed: Jan. 4, 1984

[30] Foreign Application Priority Data

Jan. 11, 1983 [JP] Japan .................................. 58-2570

[51] Int. Cl.⁴ ............................................ H04N 5/783
[52] U.S. Cl. .................................. 360/10.3; 358/343; 360/19.1; 360/21
[58] Field of Search .................... 360/19.1, 20, 21, 18, 360/9.1, 10.3, 84, 64; 358/343

[56] References Cited

U.S. PATENT DOCUMENTS 3,278,678 10/1966 Rank ...................................... 360/18
3,846,819 11/1974 Warren ................................. 360/84
3,925,816 12/1975 Kihara ................................ 360/19.1
4,293,880 10/1981 Tsukada ................................ 360/64

FOREIGN PATENT DOCUMENTS 87114 8/1983 European Pat. Off. ........... 360/19.1
52-40112 3/1977 Japan .................................... 360/21
55-77012 6/1980 Japan .................................... 360/21

Primary Examiner—Alan Faber
Attorney, Agent, or Firm—Jordan and Hamburg

[57] ABSTRACT

A multi-mode recording and playback system for VTR records audio signals and video signals and plays them back from audio tracks and video tracks on a magnetic tape by means of a plurality of rotating audio and video heads. A rotating drum around which a magnetic tape is wound carries therewith first to fourth rotary video heads and first and second rotary audio heads in predetermined relations with respect to angle and vertical level. In a desired mode, the audio heads write (read) audio signals in audio tracks, and the video heads write (read) video signals in video tracks, such that the centers of the audio and video tracks substantially coincide with each other.

15 Claims, 8 Drawing Figures

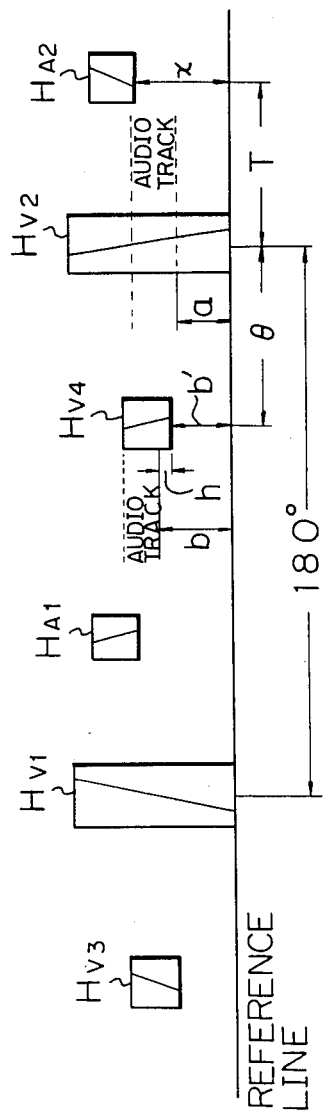

MULTI-MODE MAGNETIC RECORDING SYSTEM AND MULTI-MODE MAGNETIC RECORDING AND PLAYBACK SYSTEM FOR VTR

BACKGROUND OF THE INVENTION

The present invention relates to a multi-mode magnetic recording system and multi-mode magnetic recording and playback system for a video tape recorder (VTR) and, more particularly, to a system for recording audio signals into tracks common to video signals and system for playing them back thereoutof.

As well known in the art, in a helical scan magnetic recording and playback apparatus (VTR), a plurality of rotary heads, such as two, are mounted on a drum or like rotatable member at an equal angular distance. A magnetic tape is wound around the rotary member over an angular range which may be a little over 180 degrees, for example. The rotary heads on the rotatable member are adapted to write video signals on the magnetic tape. Meanwhile, a stationary head is located in the path of travel of the magnetic tape so as to write audio signals thereon. During playback, the rotary heads read the video signals and the stationary head, the audio signals.

A current trend in the art of video tape recording is to extend a record and playback time. This, coupled with the demand for a higher utilization rate of the given area of a magnetic tape, is increasing the tendency toward the installation of two additional rotary heads to the above-mentioned two rotary heads and, accordingly, a lower tape transport speed added to a standard speed. At the same time, there is an increasing demand for higher quality in the playback of audio signals. Because the relative speed between the running tape and the stationary head for writing and reading audio signals is low, there arises a dilemmatic situation that a decrease in the running speed of the tape significantly limits the frequency characteristic of audio signals, compared to that of video signals which are written and read by the rotary heads, restricting high quality audio reproduction.

In light of this, there has been proposed a system which frequency multiplexes an audio signal to a video signal after converting the audio signal into a predetermined mode, and records the multiplexed signals on a magnetic tape by means of a video signal read and write head and reads them out of the magnetic tape. In accordance with such a system, because a rotary head writes and reads audio signals on and from a magnetic tape of which a relative scanning speed of the head is quite high, the audio recording and playback quality is far higher than the system which writes and reads audio signals by means of a stationary head with a standard tape speed.

In the proposed recording and playback system described above, an audio signal is subjected to at least frequency modulation and then frequency multiplexed to a video signal which may be made up of a frequency modulated luminance signal and a low range carrier color signal, the multiplexed signals being written and read by a common rotary head. This brings about a problem that beat occurs between the carrier frequencies causing interference (moire) pattern on the reproduced picture.

Also known in the art is a multi-mode magnetic recording and playback system which is furnished with a rotary head exclusive for audio signal recording. In this system, video signals are written on a magnetic tape providing a guard band between adjacent tracks, while audio signals are written in the tape by the exclusive rotary head on the guard band. The system, however, suffers from the drawback that because it is not constructed to keep the centers of the video and audio tracks in order with each other, any tracking error during playback allows, for example, a video head having a given azimuth angle to read audio signals written in the same azimuthal direction or allows an audio head having a given azimuth angle to read video signals of a same azimuthal direction, resulting in an increase of cross-talk.

SUMMARY OF THE INVENTION

It is therefore an object of the present invention to provide a multi-mode magnetic recording system and multi-mode magnetic recording and playback system for VTR having multiple time modes which records and reproduces an audio signal by means of rotary heads exclusively assigned thereto and solves the problems discussed above.

It is another object of the present invention to provide a generally improved multi-mode magnetic recording system and multi-mode magnetic recording and playback system for VTR.

In one aspect of the present invention, there is provided a magnetic recording system in multiple tape speed modes for a video tape recorder which comprises a rotatable body around which a magnetic recording tape is wound over a predetermined angular range, a plurality of rotary video signal recording heads mounted on the rotatable body at predetermined relative distances and performing a recording function in at least two tape speed modes which include a first mode and a second mode, and a pair of rotary audio signal recording heads mounted on the rotatable body at a predetermined distance from each other and having azimuth angles which are different from azimuth angles of the video signal recording heads, the audio signal recording heads being arranged to perform a recording function in common in the first and second modes such that audio signals are written in audio tracks on the running magnetic recording tape at a first track pitch in the first mode and at a second track pitch in the second mode, the video signal recording heads being constructed to write video signals in video tracks on the magnetic recording tape after the audio signals are written in the audio tracks by the audio signal recording heads, the video signal recording heads being further arranged to write the video signals at a first track pitch in the first mode and at a second track pitch in the second mode and such that a center of the audio tracks and a center of the video tracks substantially coincide with each other so that the audio and video tracks are finally superposed.

The above and other objects, features and advantages of the present invention will become apparent from the following detailed description taken with the accompanying drawing.

BRIEF DESCRIPTION OF THE DRAWING

FIG. 5 is a developed view of the various heads arranged in the manner shown in FIG. 1;

DESCRIPTION OF THE PREFERRED EMBODIMENTS

While the multi-mode magnetic recording system and multi-mode magnetic recording and playback system for VTR of the present invention is susceptible of numerous physical embodiments, depending upon the environment and requirements of use, substantial numbers of the herein shown and described embodiments have been made, tested and used, and all have performed in an eminently satisfactory manner.

VTRs to which the present invention is applicable are of the type capable of recording and reproducing signals not only in an ordinary standard mode (2-hours mode) but also in a mode different from the standard (e.g. 6-hours mode), thereby enhancing efficient use of the available area of a magnetic recording tape. In such VTRs, the present invention is directed to further enhancing quality recording and playback of audio signals while preserving the conditions stated above. Basically, this is achieved by employing an additional set of read and write heads exclusively assigned to audio signals and, in order to utilize a difference between the audio signal band and the video signal band, writing an audio signal first and then a video signal over the audio signal track such that their centers substantially coincide with each other so that the two tracks are superposed. A principle technique for forming superposed tracks and reading signals from the superposed tracks is known from such as U.S. Pat. No. 3,278,678, but is only for a single time mode configuration.

Figure 1:
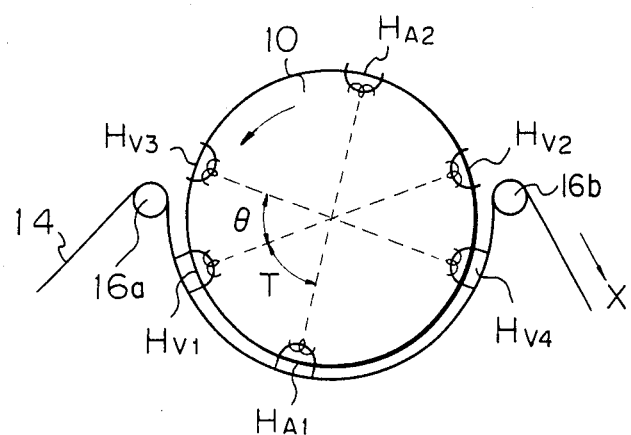
FIGS. 1 and 2 are a plan view and a side elevation respectively showing one embodiment of a head arrangement and the like in accordance with the present invention.
Figure 2:
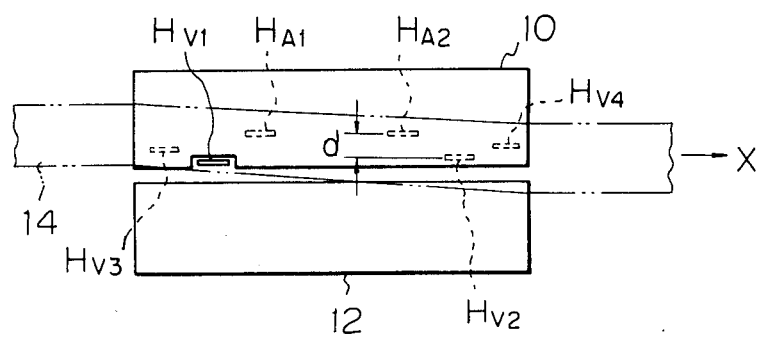

Referring to FIGS. 1 and 2, a head arrangement for a multi-mode magnetic recording system or a multi-mode magnetic recording and playback system embodying the present invention is shown. As will be described, the system includes a plurality of (two) video heads for an ordinary standard mode (e.g. 2-hours mode), a plurality of (two) video heads for a mode different from the standard (e.g. 6-hours mode), and a plurality of (two) audio heads independently of the video heads.

First, the arrangement for the standard mode (2-hours mode) will be described. A rotary drum 10, which is an exemplary rotatable member, ridigly carries on its periphery a pair of video signal read and write heads $H_{V1}$ and $H_{V2}$ for the standard mode. These heads $H_{V1}$ and $H_{V2}$ face each other at an angular spacing of 180 degrees along the circumference of the rotary drum 10. The drum 10 also carries therewith audio signal read and write heads $H_{A1}$ and $H_{A2}$ ahead the video signal read and write heads $H_{V1}$ and $H_{V2}$ respectively, each by an angle T with respect to an intended direction of rotation of the drum 10. The standard mode video heads $H_{V1}$ and $H_{V2}$ are respectively positioned ahead of video signal read and write heads $H_{V3}$ and $H_{V4}$ for a mode other than the standard (e.g. 6-hours mode) each by an angle $\theta$ with respect to the rotating direction of the drum 10. As shown in FIG. 2, the heads $H_{V1}$ and $H_{V2}$ are positioned at the same level on the drum 10 and below the heads $H_{A1}$ and $H_{A2}$ at a distance d. The drum 10 is disposed above a stationary drum 12 in such a manner that its bottom faces the top of the drum 12 across a small spacing. A magnetic tape 14 is guided by guide poles 16a and 16b to extend around the rotary drum 10 over an angle somewhat larger than 180 degrees, while being inclined relative to the drum 10. During a recording or playback operation, the drum 10 is driven counterclockwise about its axis as viewed in FIG. 1, and the tape 14 in a direction indicated by an arrow X.

The rotary heads $H_{V1}$ and $H_{V2}$ differ in azimuth angle from each other. The rotary heads $H_{A1}$ and $H_{A2}$ have azimuth angles which are substantially larger than those of the rotary heads $H_{V1}$ and $H_{V2}$. As will be described, video tracks formed by the heads $H_{V1}$ and $H_{V2}$ pair and audio tracks formed by the heads $H_{A1}$ and $H_{A2}$ pair are located such that the centers thereof substantially coincide with each other. Therefore, it is preferable that the difference in azimuth angle between the heads $H_{V1}$ and $H_{A1}$ and that between the heads $H_{V2}$ and $H_{A2}$ be larger than that between the heads $H_{V2}$ and $H_{A1}$ or that between the heads $H_{V1}$ and $H_{A2}$ where they ($H_{V2}-H_{A1}$, $H_{V1}-H_{A2}$) do not superpose their tracks on each other. The azimuth angles of the heads $H_{A1}$ and $H_{A2}$ have to be different from those of the heads $H_{V1}$ and $H_{V2}$, otherwise audio signals may be reproduced with crosstalk components of the video signals; thus, they should preferably be substantially larger than those of the heads $H_{V1}$ and $H_{V2}$ to minimize the crosstalk to occur during playback. In this particular embodiment, the azimuth angle refered to the line perpendicular to the head rotary plane is selected to be $-6$ degrees for the heads $H_{V1}$ and $H_{V3}$, $+6$ degrees for the heads $H_{V2}$ and $H_{V4}$, $+30$ degrees for the head $H_{A1}$, and $-30$ degrees for the heads $H_{A2}$.

In order to align the video tracks formed by the heads $H_{V1}$ and $H_{V2}$ pair with the audio tracks formed by the heads $H_{A1}$ and $H_{A2}$ pair to have approximately a common center, as previously described, each of the heads $H_{A1}$ and $H_{A2}$ is positioned ahead of the associated head $H_{V1}$ or $H_{V2}$ by the angle T and above it by the distance d. In the illustrated embodiment, the drum has a diameter of 62 millimeters, the angle T is 55 degrees, and the distance d is 33.72 microns by way of example. Due to the vertical distance d, the heads $H_{A1}$ and $H_{A2}$ start forming audio tracks respectively at positions which are displaced about 33.72 microns from the positions where the heads $H_{V2}$ and $H_{V1}$ start forming video tracks. However, the deviation is minor and negligible in the recording or playback performances.

In order to satisfy the basic conditions described above, assuming that the head $H_{V1}$, for example, has a width of 58 microns, the width of the heads $H_{A1}$ and $H_{A2}$ ought to be designed less than $58 \times \frac{2}{3}$ microns and, therefore, the track pitch in the 2-hours mode is limited to the same width. Concerning a track layout, a track displaces 58 microns along a line perpendicular to the track in the 2-hours mode for half a rotation of the drum 10 and 58/3 microns in the 6-hours mode where no guard band is provided between adjacent tracks. Therefore, there is some freedom to locate the audio tracks with respect to the video track positions for both the 2-hours mode and the 6-hours mode by adjusting the relative mounting angle between the heads $H_{V1}$ and $H_{V2}$ group and the heads $H_{A1}$ and $H_{A2}$ group as well as the relative mounting angle between the heads $H_{V3}$ and $H_{V4}$ group and the heads $H_{A1}$ and $H_{A2}$ group.

Figure 3:
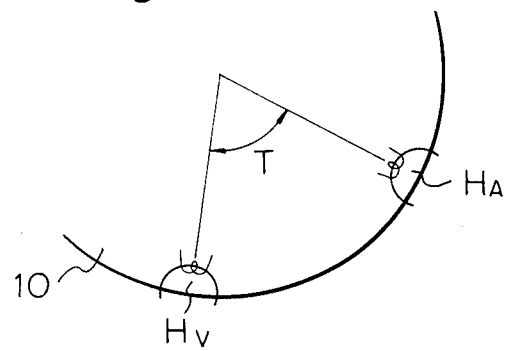
FIG. 3 is a plan view of a rotary head for video signals and that for audio signals which are mounted on a rotary drum in the embodiment.

In detail, assuming that a video head $H_V$ and an audio head $H_A$ are located at an angular distance of T degrees as shown in FIG. 3, a track displacement D (not shown) corresponding to the angular distance T is $D_2 = 58 \times T$ (degrees)/180 (degrees) for the standard (2-hours) mode if measured along the line perpendicular to the track, and $D_6 = 58/3 \times T$ (degrees)/180 (degrees) for the mode different from the standard (6-hours mode). Audio track widths smaller than 58/3 microns are undesirable from the S/N ratio standpoint, this leads a use of an audio head not very much narrower than 58/3 microns for the 6-hours mode, the figure is incidentally equal to the video track width for the mode.

Figure 4A:
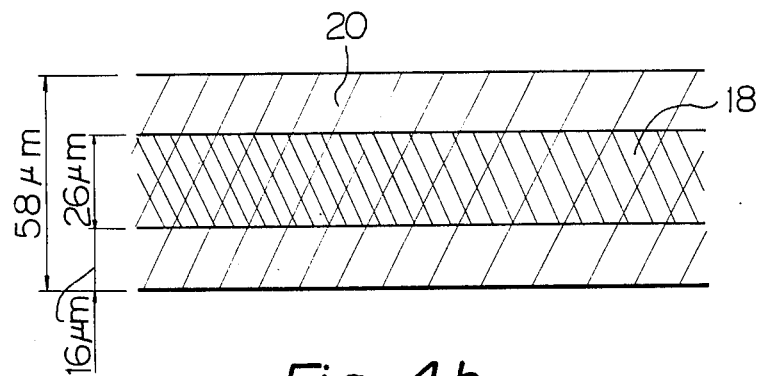
FIG. 4a is a diagram of a tape format for a standard mode 2-hours mode)

Referring to FIG. 4a, a tape format for the standard mode is shown. The video heads $H_{V1}$ and $H_{V2}$ write video signals over audio signals which have been written by the video heads $H_{A1}$ and $H_{A2}$ in audio tracks 18 so that the audio tracks 18 are held substantially at the center of video tracks 20. Because of this and a fact that the video heads and audio heads are so mounted and have substantial azimuth angle, differences as described in the foregoing, the possibility of picking up crosstalk components from adjacent tracks on which signals may be recorded with smaller azimuth angle differences with respect to that on the head scanning tracks, is minimized, resulting a favorable playback performance even under the conditions of possible tracking error occurred in the playback operation.

Figure 4B:
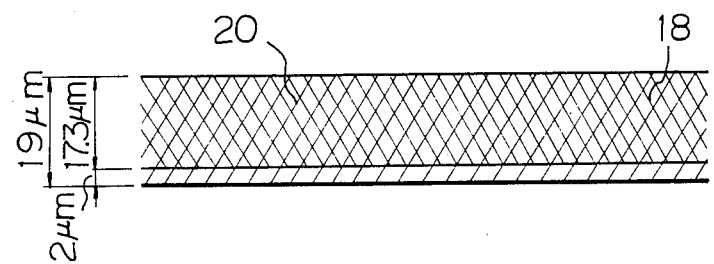
FIG. 4b is a diagram of a tape format for a mode different from the standard (6-hours mode)

In FIG. 4b, a tape format for a mode other than the standard mode, such as the 6-hours mode, is illustrated. In this case, taking into account head mounting errors and the like and to prevent video signals from being erased during sound recording, the audio tracks are laid out at a displacement of about 2 microns from the video tracks. In this manner, a recording or playback operation can be readily performed either in the standard mode (e.g. 2-hours mode) or in another mode (e.g. 6-hours mode) by adjusting the angles, levels, and other parameters of the audio heads.

Figure 6:
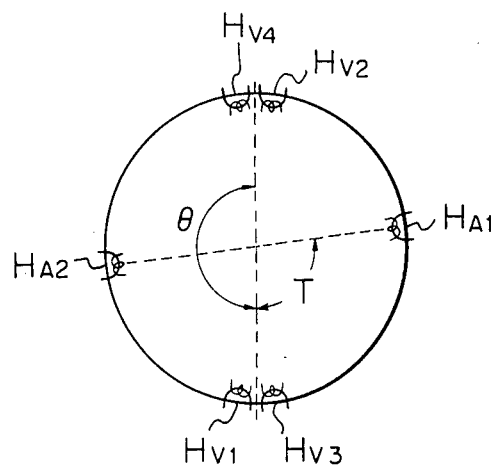
FIG. 6 is a plan view of a head arrangement in accordance with another embodiment of the present invention.

FIG. 5 shows a developed view of a head arrangement in accordance with one embodiment of the present invention. FIG. 6 shows a head arrangement which differs from the FIG. 1 arrangement in employing a double azimuth head design which is an integral assembly of a video head for the standard mode and one for a mode different therefrom. The FIG. 6 arrangement is shown in a developed view in FIG. 7.

In FIG. 5, assume that the audio tracks are positioned a microns above a reference line of the video tracks for the standard mode (e.g. 2-hours mode) at the standard mode video head positions and b microns above the reference line at the other mode video head positions, and the audio heads are held at x microns above the reference line and with an angular distance of T degrees from the standard mode video heads, and that the video heads for the standard mode and those for the other mode such as the 6-hours mode are kept at an angular, distance of $\theta$ degrees. Then, when the ratio N of tape speed in the standard mode to that in the non-standard mode is 3 a track displacement $D_6 = X - b$ in the mode other than the standard, e.g., the 6-hours mode, is $x - b = W/N \times (T+\theta)/180$, or in this case, $x - b = 58/3 \times (T+\theta)/180$, a track displacement $D_2 = X - a$ in the 2-hours mode is $x - a = WT/180$, or $x - a = 58 \times T/180$ $\therefore x = b + 58(T+\theta)/(180 \times 3)$ $x = a + 58T/180$ Solving the simultaneous equations, that is, assuming that T, $\theta$ and a are known numbers in such a head arrangement as one shown in FIG. 1, the distance b is $b = (WT - W\phi2)/(3 \times 180/2) + a$, or $b = (58T - 29\theta)/270 + a$ The head angle $\theta = 70$ degrees is attainable with the first embodiment having the head arrangement shown in FIG. 1.

Figure 7:
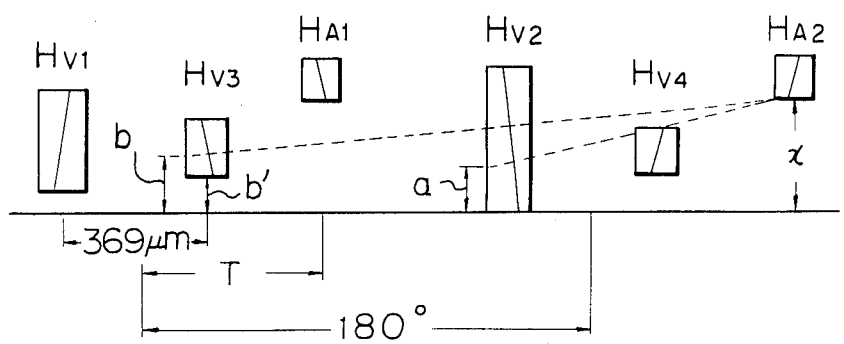
FIG. 7 is a developed view of the heads which are arranged in the manner shown in FIG. 6.

In FIGS. 6 and 7, the double azimuth head design for special playback differs from the head arrangement of FIG. 1 with regard to the positional relationship between the heads. In this case, even though one of the video head pairs and the audio heads may be common in azimuthal direction with each other in the standard mode (e.g. 2-hours mode) and another mode (e.g. 6-hours mode), the audio track position is laid a microns above the reference line of video tracks for the standard mode (e.g. 2-hours mode) and, when a, b and $\theta$ are known, the previously discussed simultaneous equations are solved to obtain $x = a + WT/180 = b + W/N \times (T+\theta)/180$ $\therefore T = (180N(b-a) + W\theta)/(N-1)W$, or $x = (Nb-a)/N-1) + W\theta/(N- \times 180$, or $x = (3b-a)/2 + 58\theta/360$ concerning the head arrangement shown in FIGS. 1 ad 5, assuming the angle T is 55 degrees, the angle $\theta$ is 70 degrees, and the audio track width is 20 microns, a is 19 microns and, therefore, b = 23.30 microns
x = 36.72 microns Where the audio track width is 26 microns, a is 16 microns and, therefore, b = 20.30 microns
x = 33.72 microns Further, where the audio track width is 30 microns, is 14 microns and, therefore, b = 18.30 microns
x = 31.72 microns As to the head arrangement shown in FIGS. 6 and 7, in which the angle $\theta$ is 180 degrees, a track width of 20 microns and a distance b of 15 microns provide a which is 19 microns and, accordingly, T = 71.38 degrees
x = 42 microns Where the track width is 26 microns and the distance b is 15 microns, a is 16 microns and, therefore, T = 85.34 degrees
x = 43.5 microns Further, where the track width is 30 microns and b is 15 microns, a is 14 microns and, therefore, T=94.66 degrees x=44.5 microns In the manner described, the system in accordance with the present invention allows one pair of audio heads to develop audio tracks optimum for both the standard mode (e.g. 2-hours mode) and another mode (e.g. 6-hours mode) by adjusting the angle and vertical level from the video heads to the audio heads. Otherwise, a total of two pairs of the audio heads would be needed for the two time modes.

The present invention is not limited to the embodiments shown and described and is applicable to a system which employs common video heads for a standard mode (e.g. 2-hours mode) and a mode different therefrom (e.g. 6-hours mode). In the latter application, too, the video and audio heads are provided with different angles to accommodate various track patterns.

The 2-hours and 6-hours modes discussed as a standard mode and a mode different therefrom are not limitative and may be replaced by any other recording time modes. The present invention is applicable even with a system which is operable in three or more different recording modes.

The audio signals and video signals have been shown and described as being recorded in the opposite azimuthal directions. However, it is sometimes not necessary to have a reverse azimuth arrangement depending upon the relationship between the audio track width, video track width, degree of azimuth angles, carrier frequency for frequency modulating audio signals, etc. Then, the azimuthal direction can naturally be made common to each other.

In summary, it can be seen that the present invention permits a tracking error developed during playback which otherwise causes a crosstalk between video and audio signals, thereby insuring a quality playback performance even in the extended time mode. This advantage is derived from the configuration in which audio tracks formed on a magnetic recording tape by audio heads and video tracks formed by video heads written over the audio tracks are positioned to have the centers thereof substantially coincident with each other.

By adjusting the angle, vertical level and the like of the video heads to audio heads, the present invention facilitates a design of such VTRs having the standard mode (e.g. 2-hours mode) and a mode different therefrom (e.g. 6-hours mode). That is, the two different modes can be accommodated in one unit so that a multimode recording system or a recording and playback system of the type described can be produced economically.

With regard to an effort to extend a video playing time, systems operable in a plurality of recording modes may generally be classified into three types, i.e. one using a video head commonly for all the recording modes, one allocating a specific head to a specific recording mode and assigning a common azimuth angle to adjacent video heads, and one allocating a specific head to a specific recording mode but assigning different azimuth angles to the different heads. As far as audio is concerned, the present invention is applicable to all such different types of video systems and affords compatibility to recording media which are prepared by the different types of systems.

Furthermore, in accordance with the present invention, the track pattern may be suitably modifiable so long as it conforms to the equations.

Various modifications will become possible for those skilled in the art after receiving the teachings of the present disclosure without departing from the scope thereof.

What is claimed is:

1. A magnetic recording system in multiple tape speed modes for a video tape recorder comprising:
   a rotatable body around which a magnetic recording tape is wound over a predetermined angular range;
   a plurality of rotary video signal recording heads mounted on said rotatable body at predetermined relative distances and performing a recording function in at least two tape speed modes which include a first mode and a second mode; and
   a pair of rotary audio signal recording heads mounted on the rotatable body at a predetermined distance from each other and having azimuth angles which are different from azimuth angles of the video signal recording heads;
   the audio signal recording heads being arranged to perform a recording function in common in the first and second modes such that audio signals are written in audio tracks on the running magnetic recording tape at a first track pitch in the first mode and at a second track pitch in the second mode;
   the video signal recording heads being arranged to write video signals in video tracks on the magnetic recording tape after the audio signals are written in the audio tracks by the audio signal recording heads, the video signal recording head being further arranged to write the video signals at a first track pitch in the first mode and at a second track pitch in the second mode and such that a center of the audio tracks and a center of the video tracks substantially coincide with each other so that the audio and video tracks are finally superposed.

2. A magnetic recording system as claimed in claim 1, in which the audio signal recording heads are mounted on the rotatable body in a predetermined positional relation to the video signal recording head with respect to angle.

3. A magnetic recording system as claimed in claim 2, in which the audio signal recording heads are mounted on the rotatable body in a predetermined positional relation to the video signal recording heads with respect to vertical level.

4. A magnetic recording system as claimed in claim 3, in which the video signal recording heads comprise a first rotary video head and a second rotary video head which are mounted on the rotatable body at an angular distance of 180 degrees from each other.

5. A magnetic recording system as claimed in claim 4, in which the video signal recording heads further comprise a third rotary video head and a fourth rotary video head which are mounted on the rotatable body at an angular distance of 180 degrees from each other, the first video head being mounted on the rotatable body at a predetermined angular distance from the third video head.

6. A magnetic recording system as claimed in claim 5, in which the first and third video heads have azimuth angles which are different from azimuth angles of the second and fourth video heads respectively.

7. A magnetic recording system as claimed in claim 6, in which azimuth angles of the first and third video heads are −6 degrees and azimuth angles of the second and fourth video heads are +6 degrees.

8. A magnetic recording system as claimed in claim 5, in which the audio signal recording heads comprise a first rotary audio head and a second rotary audio head which are mounted on the rotatable body at an angular distance of 180 degree from each other.

9. A magnetic recording system as claimed in claim 8, in which the first and second audio heads are mounted on the rotatable body at positions predetermined angle ahead of the first and second video heads respectively.

10. A magnetic recording system as claimed in claim 8, in which azimuth angles of the first and second audio heads are different from each other.

11. A magnetic recording system as claimed in claim 10, in which the azimuth angles of the first and second audio heads are commonly larger than the azimuth angles of the first to fourth video heads.

12. A magnetic recording system as claimed in claim 10, in which the azimuth angle of the first audio head is +30 degrees and the azimuth angle of the second audio head is −30 degrees.

13. A magnetic recording system as claimed in claim 5, in which the vertical level x of the rotary audio signal recording heads satisfies the following expression:

$$x = (Nb-a)/(N-1) + W\theta/180(N-1),$$

where N is the ratio of tape speed in the first mode to that in the second mode, a is the vertical level of the audio track in the first mode, b is the vertical level of the audio track in the second mode, W is the video track pitch in the first mode, and $\theta$ is said predetermined angular distance between said first and third video heads.

14. A magnetic recording system as claimed in claim 5, in which the predetermined angular distance T between the audio signal recording heads and the first and second video heads satisfies the following expression:

$$T = (180N(b-a) + W\theta)/(N-1)W,$$

where N is the ratio of tape speed in the first mode to that in the second mode, a is the vertical level of the audio track in the first mode, b is the vertical level of the audio track in the second mode, W is the video track pitch in the first mode, and $\theta$ is said predetermined angular distance between said first and third video heads.

15. A magnetic recording and playback system in multiple tape speed modes for a video tape recorder comprising:

a rotatable body around which a magnetic recording tape is wound over a predetermined angular range;

a plurality of rotary video signal recording and playback heads mounted on said rotatable body at predetermined relative distances and performing a recording function in at least two tape speed modes which include a first mode and a second mode; and a pair of rotary audio signal recording and playback heads mounted on the rotatable body at a predetermined distance from each other and having azimuth angles which are different from azimuth angles of the video signal recording and playback heads;

the audio signal recording and playback heads being arranged to perform a recording function in common in the first and second modes such that audio signals are written in audio tracks on the running magnetic recording tape at a first track pitch in the first mode and at a second track pitch in the second mode;

the video signal recording and playback heads being arranged to write video signals in video tracks on the magnetic recording tape after the audio signals are written in the audio tracks by the audio signal recording and playback heads, the video signal recording and playback heads being further arranged to write the video signals at a first track pitch in the first mode and at a second track pitch in the second mode and such that a center of the audio tracks and a center of the video tracks substantially coincide with each other so that the audio and video tracks are finally superposed.

* * * * *